2 Sheets—Sheet 1.

A. H. SNYDER.
Apparatus for Cooling and Warming Milk.
No. 224,485. Patented Feb. 10, 1880.

Witnesses
Alexander Patterson
Harry Smith

Inventor
Amos H. Snyder
by his Attorneys
Howson and Son

2 Sheets—Sheet 2.

A. H. SNYDER.
Apparatus for Cooling and Warming Milk.
No. 224,485. Patented Feb. 10, 1880.

Witnesses
Alexander Patterson
Harry Smith

Inventor
Amos H. Snyder
by his Attorneys
Howson and Son

N. PETERS, PHOTO-LITHOGRAPHER, WASHINGTON, D. C.

UNITED STATES PATENT OFFICE.

AMOS H. SNYDER, OF QUAKERTOWN, PENNSYLVANIA.

APPARATUS FOR COOLING AND WARMING MILK.

SPECIFICATION forming part of Letters Patent No. 224,485, dated February 10, 1880.

Application filed December 1, 1879.

*To all whom it may concern:*

Be it known that I, AMOS H. SNYDER, of Quakertown, Bucks county, Pennsylvania, have invented a new and useful Improvement in Apparatus for Cooling or Warming Milk, of which the following is a specification.

The object of my invention is to so construct apparatus for cooling or warming milk as to provide for the ready and accurate adjustment or movement of the coil of pipes in the tank, and to prevent injury to the coil of pipes by the freezing of the water contained therein.

My invention consists of a certain combination of gearing, fully described hereinafter, for effecting the movement of the coil; also, of the combination of the tank with an adjustable coil having a valved discharge branch; and, finally, it consists of the combination of guide-bars carrying a coil and having racks with a rock-shaft and bars carrying a shaft and pinions, all as hereinafter set forth.

Figure 1:
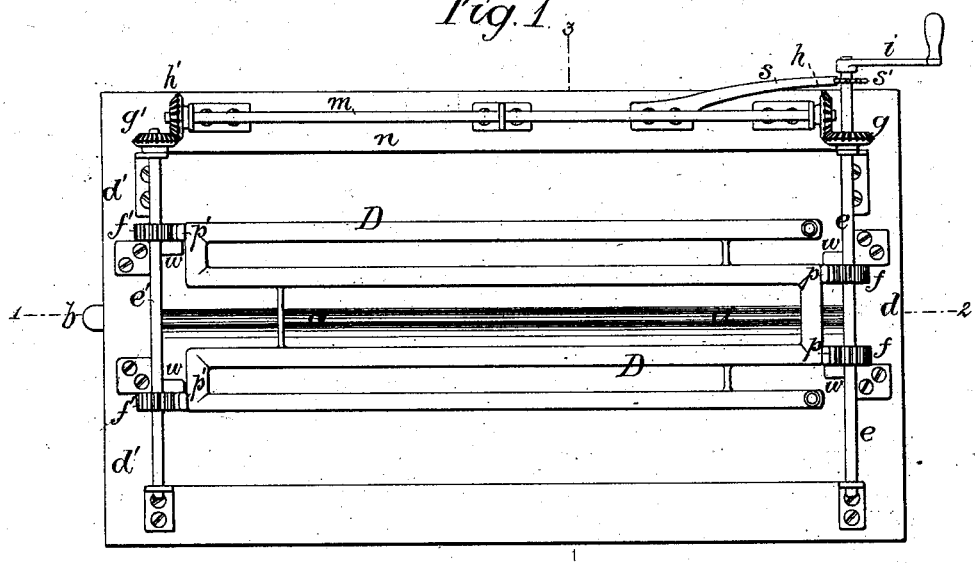
Figure 2:
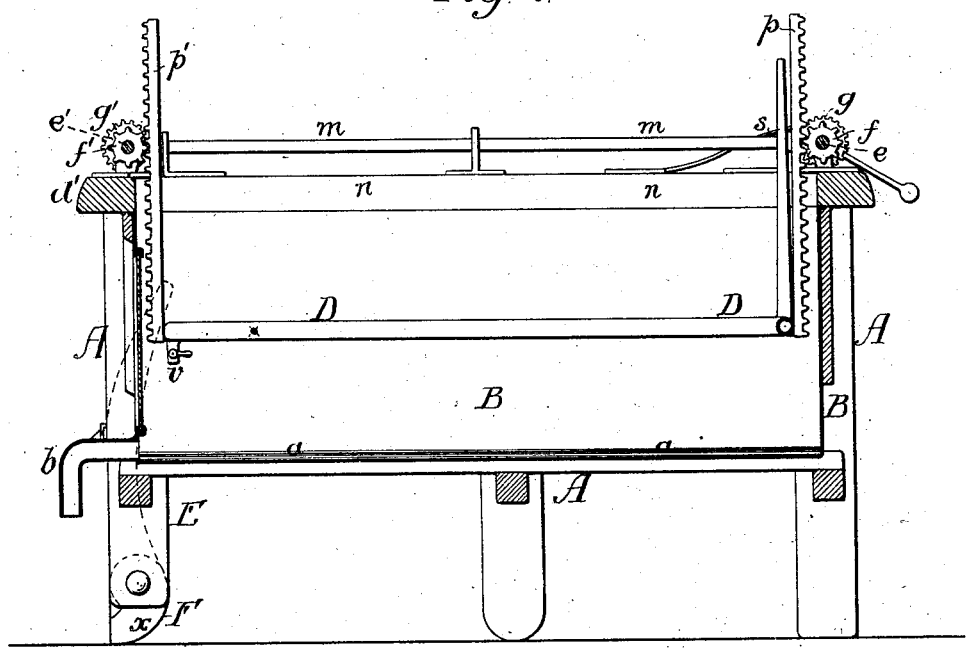
Figure 6:
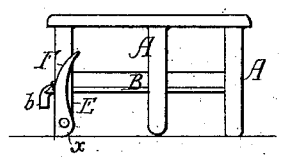
Figure 3:
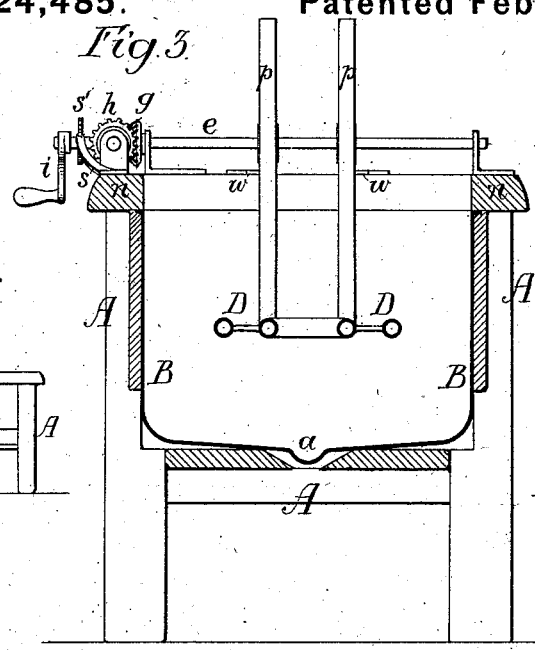
Figure 7:
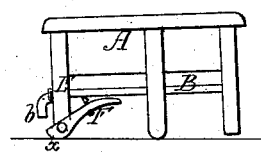
Figure 4:
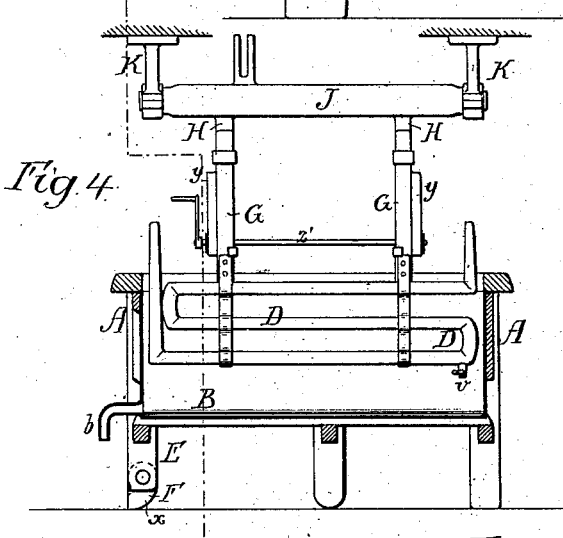
Figure 5:
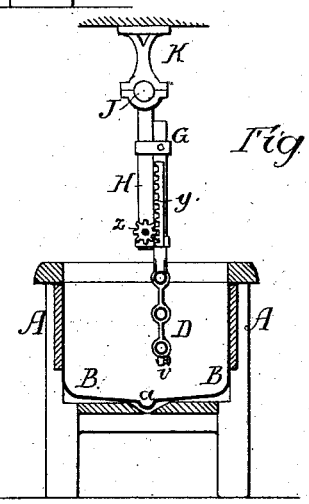

In the accompanying drawings, Figure 1, Sheet 1, is a plan view of a milk cooling or warming apparatus with my improvements; Fig. 2, a longitudinal section of the same on the line 1 2; Fig. 3, Sheet 2, a transverse section on the line 3 4, Fig. 1; Figs. 4 and 5, longitudinal and transverse sections, respectively, illustrating a further application of my improvement; Figs. 6 and 7, diagrams showing one of the features of my invention; and Figs. 8 and 9, views representing a modification.

Figs. 4, 5, 6, 7, 8, and 9 are drawn to a reduced scale.

A is a frame carrying a sheet-metal tank, B, which, in the present instance, is rectangular in form and has a bottom slightly inclined to a central groove or depression, $a$, extending from end to end of the tank, and coinciding with the discharge-pipe $b$, with which one end of the said tank is furnished.

In Figs. 1, 2, and 3 the end rail, $d$, of the frame A is provided with bearings for a transverse shaft, $e$, carrying two pinions, $f f$, and the opposite end rail, $d'$, has bearings for a similar shaft, $e'$, carrying pinions $f' f'$. The shaft $e$ has a bevel-wheel, $g$, which gears into a bevel-pinion, $h$, on one end of a shaft, $m$, adapted to bearings on the side rail, $n$, of the frame A, the opposite end of said shaft $m$ having a bevel-pinion, $h'$, which gears into a bevel-wheel, $g'$, on the shaft $e'$.

The pinions $f$ of the shaft $e$ gear into racks $p$, secured to and projecting upward from one end of a coil of pipe, D, the opposite end of which is furnished with racks $p'$, adapted to the pinions $f'$ on the shaft $e'$.

Steam or hot or cold water may be caused to circulate through the coil D, in accordance with the desired treatment of the milk, and the coil can be readily and accurately adjusted, by means of the gearing above described, to any height which may be rendered necessary by the quantity of milk in the tank B, or by that portion of the supply of milk to which heat or cold has to be imparted. The coil D may be retained in any position to which it has been adjusted by adapting the end of a spring-catch, $s$, on the rail $n$, to one of the recesses in a notched wheel, $s'$, carried by the shaft $e$, (see Figs. 1 and 2,) or by releasing said wheel $s'$ from the control of the catch and imparting a rocking motion to the crank $i$ a regular rising and falling motion may be imparted to the coil. One end of the coil D has an outlet branch, $v$, provided with a suitable cock or valve, so that when the milk has been withdrawn from the tank B the coil may be elevated and the cock or valve opened, thereby permitting the water in the coil to flow into the tank for the purpose of washing the same, and at the same time emptying the water from the coil, thereby preventing the injury to the latter which is likely to occur if the water is allowed to remain in the pipes and become frozen. Guide-plates $w$ on the end rails, $d\ d'$, serve to prevent lateral movement of the coil and its racks.

In order to facilitate the examination of the contents of the tank B one end of the same has an opening fitted with glass, as shown in Fig. 2.

The legs E at one end of the frame-work A are shorter than the legs at the opposite end, and are provided with levers F, which may be adjusted either to the position shown in Fig. 6 or to that shown in Fig. 7. When the levers are in the position Fig. 6 their short arms form continuations of the legs E, and maintain the frame A in such a position that the tank B will be level. The long arms of the levers are provided with hooked projections, which engage with latches on the legs E, and retain the levers in the position Fig. 6. When the levers are released, however, and turned to the position shown in Fig. 7, the end of the frame will be lowered and the tank tilted, so as to more readily discharge its contents. In order that the lowering may be accomplished without shock or jar the short arms of the levers have curved faces $x$.

In the apparatus shown in Figs. 4 and 5 the coil D is carried by vertical bars G, adapted to suitable guides on bars H, which project downward from a rock-shaft, J, the latter being adapted to suitable bearings K in hangers depending from the rafters of the room or apartment containing the apparatus.

The bars G have racks $y$, which are adapted to pinions $z$ on a longitudinal shaft, $z'$, the latter turning in bearings on the bars H. By operating the shaft $z'$ the coil D may be raised or lowered in the tank B, or a combined vibrating and vertical reciprocating movement may be imparted to the coil, the latter movement being of especial advantage in mixing curds.

Chain-gearing, instead of bevel-gearing, may be employed for transmitting the movement of the shaft $e$ to the shaft $e'$, the bevel-gearing, however, being preferred.

Figure 8:
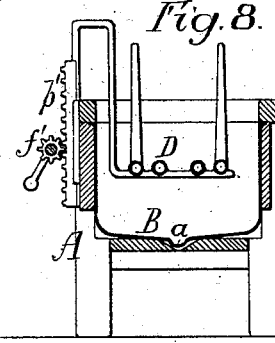
Figure 9:
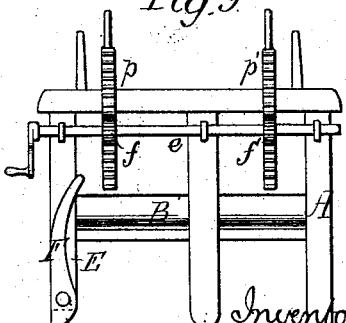

In Figs. 8 and 9 I have shown a modification of my invention, in which the racks $p\ p'$ form part of yokes attached to the coil D, the racks in this case being arranged on the outside of the tank, instead of on the inside, and being adapted to pinions $f\ f'$, carried by a shaft, $e$, having its bearings at one side of the frame A. The opposite side of the frame and coil may, if desired, have a similar arrangement, the two being so connected as to work in unison.

It has been found in practice that if the tank B has a groove or depression, $a$, in the bottom extending from end to end and in line with the discharge-pipe $b$, a current along said groove will be created on opening the valve in the pipe, and the whirling of the fluid adjacent to the point of discharge will be prevented. By this means I am enabled to draw off the milk from the tank B after the cream has risen thereon without creating such an agitation of the milk as to disintegrate the mass of cream on the surface of the same.

I do not desire to claim, broadly, the combination of the tank with a cooling or warming coil vertically adjustable therein, nor do I claim the combination of the legs of the frame-work with adjustable blocks for elevating or lowering one end of said frame-work; but

I claim as my invention—

1. The combination of the frame A and the tank B, the coil D, having racks $p\ p'$, the shaft or shafts having pinions $f\ f'$, adapted to said racks, and mechanism, substantially as described, whereby said pinions are caused to operate in unison to effect the raising or lowering of the coil D, as set forth.

2. The combination of the tank B, the coil D, having a valved outlet branch, $v$, and devices, substantially as described, for effecting the vertical adjustment of said coil, as set forth.

3. The combination of the coil D, the bars G, carrying the same and provided with racks $y$, the rock-shaft J, having arms H, with guides for the bars G, and the shaft $z'$, having pinions $z$, adapted to said racks $y$, as set forth.

In testimony whereof I have signed my name to this specification, in the presence of two subscribing witnesses.

AMOS H. SNYDER.

Witnesses:
 ALEXANDER PATTERSON,
 HARRY SMITH.